United States Patent [19]

Dharmadhikari

[11] Patent Number: 4,929,923

[45] Date of Patent: May 29, 1990

[54] THIN FILM RESISTORS AND METHOD OF TRIMMING

[75] Inventor: Vineet S. Dharmadhikari, Palm Bay, Fla.

[73] Assignee: Harris Corporation, Melbourne, Fla.

[21] Appl. No.: 357,898

[22] Filed: May 26, 1989

[51] Int. Cl.[5] ........................ H01C 1/012; B23K 26/00

[52] U.S. Cl. ........................................ 338/308; 338/195; 338/287; 338/293; 219/121.68; 29/610.1; 29/620

[58] Field of Search ............... 338/308, 203, 293, 287, 338/195; 219/121.68, 121.4, 121.19; 29/610.1, 620

[56] References Cited

U.S. PATENT DOCUMENTS 3,864,825 2/1975 Holmes ........................... 338/308 X 4,846,949 7/1989 Tu et al. .......................... 204/192.21

*Primary Examiner*—Bruce A. Reynolds

*Assistant Examiner*—Marvin M. Lateef

*Attorney, Agent, or Firm*—Barnes & Thornburg

[57] ABSTRACT

A resistor having a first portion of a high resistivity material and a second portion of a low resistivity material and laser trimming the low resistivity material portion.

17 Claims, 1 Drawing Sheet

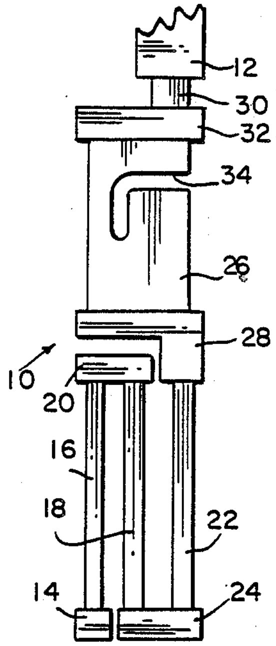
PRIOR ART
FIG. 1
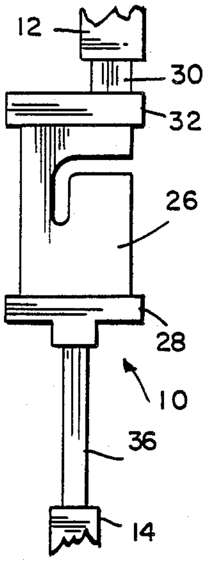
FIG. 2
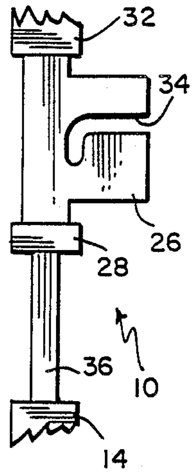
FIG. 3
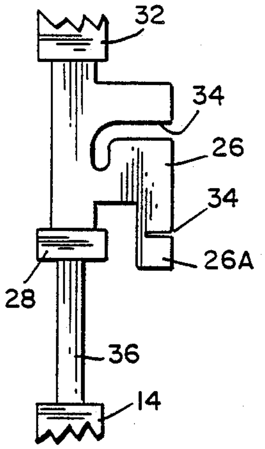
FIG. 4
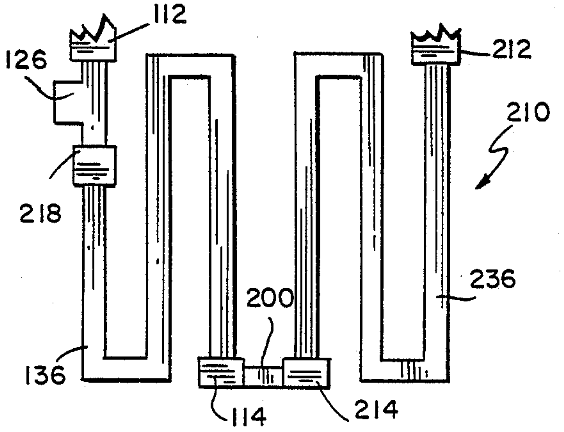
FIG. 5
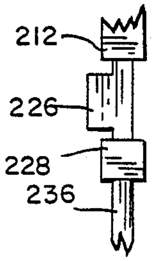

THIN FILM RESISTORS AND METHOD OF TRIMMING

BACKGROUND AND SUMMARY OF THE INVENTION

The present invention relates generally to thin film resistors and more specifically to a method of fabricating thin film resistors which are capable of laser trimming.

In many integrated circuits, the accuracy and matching of the resistors is very importance. This includes not only digital-to-analog converters, differential amplifiers and subscriber line interface circuits, but other integrated circuits. Heretofore, the method of adjusting resistors in these circuits included providing a resistive material and laser trimming the resistive material. Commonly used resistive materials which are capable of laser trimming have included nickel-chromium (nichrome) and tantalum nitride. These materials generally have a low resistivity and therefore require substantial amounts of surface area in order to produce the desired resistance and maintain laser trimmability of the resistor. Also, excess trimming of the resistor is needed to improve ratio matching, thus resulting in resistor instability. The commonly used laser is a YAG. Although other materials can be used, for example, chrome silicide or cermets which have higher sensitivity, than nichrome, a different laser must be used providing substantially higher power for trimming purposes. However, substantial laser trimming of these chrome silicide resistors causes resistor shift over life and therefore is detrimental to the remainder of the circuit. To solve this problem, several nickel chromium resistor segments are used to satisfy circuit resistance requirements.

Also contact materials connected to the ends of the resistors or interconnecting resistor segments have generally included aluminum. These interfaces deteriorate over a period of time. Similarly, the use of series connected resistors in order to obtain the required resistance greatly increased the number of contacts or interconnects of aluminum and therefore increase the amount of contact area which is subject to deterioration.

Thus, it is an object of the present invention to provide an improved thin film resistor taking up less surface area.

Another object of the present invention is to provide a laser trimmable thin film resistor which takes up less surface area.

An even further object of the present invention is to provide a laser trimmable thin film resistor with minimum contact degragation.

These and other objects are achieved by providing a resistor having a first portion of a high resistivity material and a second portion of a low resistivity material and laser trimming the low resistivity material portion. The use of the higher resistivity material greatly reduces the surface area required for the total resistance. This also reduces greatly the number of contacts or interconnects of aluminum and therefore the possibility of contact area deterioration. In an integrated circuit having two resistors which must be matched, one resistor, having total resistance lower than the second resistor, would include the laser trimmable portion of the lower resistivity material. Alternatively, both the resistors could be formed of substantially equal total resistance and each include a laser trimmable portion to improve accuracy and matching.

Other objects, advantages and novel features of the present invention will become apparent from the following detailed description of the invention when considered in conjunction with the accompanying drawings.

BRIEF DESCRIPTION OF THE DRAWINGS

FIG. 1 is a plan view of a laser trimmable resistor of the prior art.

FIG. 2 is a plan view of a laser trimmable resistor according to the principles of the present invention.

FIG. 3 is a plan view of another laser trimmable resistor according to the principles of the present invention.

FIG. 4 is a plan view of an even further laser trimmable resistor according to the principles of the present invention.

FIG. 5 is a plan view of a pair of resistors to be matched incorporating the principles of the present invention.

FIG. 6 is a modification of the second resistor of FIG. 5 incorporating the principles of the present invention.

DETAILED DESCRIPTION OF THE DRAWINGS

FIG. 1 illustrates a resistor 10 of the prior art having terminals 12 and 14. A first resistive leg 16 is connected to terminal 14 and is connected with second resistive leg 18 by an interconnect 20. A third resistive leg 22 is connected to the second resistive leg 18 by an interconnect 24. A fourth large area portion 26, which is to be laser trimmed, is connected to the third resistive leg 22 by an interconnect 28. A fifth resistive element 30 is connected to the fourth laser trimmable portion 26 by an interconnect 32 at one end and at its other end to the terminal 12 of the resistor. A typical material which is used to form the resistor is nichrome. To trim the resistor to its desired value, it is subjected to a laser light producing area 34 which is removed or destroyed portions of the nichrome laser trimmable portion 26. For a 15 K ohm total resistance for resistor 10, the resistive legs 16, 18 and 22 have a dimension of 500 microns×20 microns, the laser trimmable element 26 176 microns×92 microns, a resistive element 30 40 microns×25 microns. The resistivity of the nichrome is 20 ohms per square. The thickness of the resistive layers is in the range of 80 to 120 A°.

FIG. 2 shows a modified resistor 10 having the same overall, or total resistance, of 15 K ohms, wherein the resistive elements 16, 18 and 22 are replaced by a single resistive element 36 connected to terminal 14 and to the laser trimmable resistive element 26 by interconnect 28. The resistivity of the material used to form resistive portion 36 is at least five times the resistivity of the material used to form the laser trimmable portion 26. This allows a substantial reduction in the surface area needed while maintaining a large enough surface to be laser trimmable. Wherein the laser trimmable material 26 is nickel chromium, an example of the non-laser trimming material for segment 36 would be chrome silicide which has a resistivity of 1,000 to 2,000 ohms per square. The dimension of the resistive leg 36 for the 15 K ohm total resistance would be 160 microns×20 microns. Since the resistive element 36 is only a single element, two interconnect portions 20 and 24 have been eliminated and therefore, the amount of area of contact deterioration is substantially reduced. This is addition to the surface area reduction.

Although nichrome has been selected for the laser trimmable material and chromium silicide for the non-laser trimmable portion of the resistor, other materials may be used. For example, the laser trimmable portion may be selected from the group of nickel-chromium, tantalum nitride; and the non-laser trimmable material selected from the group of chrome silicide and cermets. The contact material generally used is aluminum, but other contact materials may be used, for example, aluminum alloys, copper, gold.

A further modification of the laser trimmable portion 26 is illustrated in FIG. 3, wherein the width of the laser trimmable material at the contacts 32 and 28 has been substantially reduced. Although this does not reduce the overall area of the laser trimmable material, it does reduce the contact area and thereby, again reduces the area of deterioration.

FIG. 4 illustrates an even further embodiment of the laser trimmable portion 26. By forming a separate and distinctive tab **26*a*, not only can be laser trimming 34 be in the main body of the laser trimmable portion 26, but the tab 26*a* may be disconnected from the main body thereby increasing the total resistance and also fine tuning of the resistor match obtained by trimming the tab 26*a* (without the required destruction of the resistive material 26**).

Although FIGS. 1–4 have described providing a single resistor capable of laser trimming with reduced total area, and the trimming of a resistor to a desired value, there are many applications wherein a pair of resistors must be matched. As illustrated in FIG. 5, resistors 110 and 210 are in an integrated circuit which requires that their resistance be matched. The resistor 110 is connected between terminals 112 and 114 and includes a trimmable portion 126 and a non-trimmable portion 136 connected by interconnect 128. The second resistor 210 between terminals 212 and 214 includes only a non-trimmable portion 236. The total resistance of resistor 110 is made smaller than the total resistance of the second resistor 210 such that resistor 110 may be trimmed to match the resistance of resistor 210. A common interconnect 200 connects the two terminals 114 and 214. As is common in integrated circuit, the common terminal 200 may connect the resistors to a common potential wherein the resistors 110 and 210 are connected to respective legs of a differential amplifier, for example. In practice, each of the resistances are measured and the trimmable portion 126 is laser trimmed until the total resistance of resistor 110 equals that of resistor 210.

If preferred, and in certain situations, both resistors should be trimmable. FIG. 6 shows the resistor 210 including a laser trimmable portion 226 connected to terminal 212 and to the non-trimmable portion 236 by interconnect 228. As in the previous examples, the trimmable materials 126, 226 may be nichrome and the non-trimmable 136, 236 may be chromium silicide.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of trimming resistors in an integrated circuit comprising:

forming a first resistor on a substrate having a first portion of a first material having a first resistivity and a second portion of a second material having a second resistivity substantially smaller than said first resistivity; and trimming at least a selective portion of said second portion of said first resistor to increase the total resistance of said resistor over a range of resistances.

2. A method according to claim 1, wherein said first material is selected to have a resistivity of at least five times the resistivity of said second material.

3. A method according to claim 1, wherein said first material is selected from the group of chrome-silicide or cermets, and the second material is selected from the group of nickel-chromium (nichrome) or tantalum nitride.

4. A method according to claim 3, including connecting said first and second portions of said resistor by a conductor selected from the group of aluminum alloys, copper, gold.

5. A method according to claim 1, wherein said first resistor is formed with said first and second portion connected in series electrically on said substrate.

6. A method according to claim 1, wherein said first and second portions are formed to each have a thickness in the range of 80 A° to 1000 A°.

7. A method according to claim 1, wherein said trimming includes subjecting said second portion to a laser.

8. An integrated circuit comprising:

a substrate;

a first resistor on said substrate having a first portion of a first material having a first resistivity and a second portion of a second material having a second resistivity substantially smaller than said first resistivity; and wherein at least a selective portion of said second portion has been trimmed to increase the total resistance of said first resistor over a range of resistances.

9. An integrated circuit according to claim 8, wherein said first and second portions of said first resistor are connected in series electrically on said substrate.

10. An integrated circuit according to claim 8, wherein said first material has a resistivity of at least five times the resistivity of said second material.

11. An integrated circuit according to claim 8, wherein said first material is selected from the group of chrome silicide or cermets, and the second material is selected from the group of nickel-chromium (nichrome) or tantalum nitride.

12. An integrated circuit according to claim 8, wherein a conductor connects said first and second portions of said resistor selected from the group of aluminum alloys, copper, gold.

13. An integrated circuit according to claim 8, wherein said first and second portions each have a thickness in the range of 80 A° to 1000 A°.

14. An integrated circuit comprising:

a substrate;

a first resistor on said substrate having a first portion of a first material having a first resistivity and a second portion of a second material having a second resistivity substantially smaller than said first resistivity;

a second resistor on said substrate of said first material having a total resistance more than the total resistance of said first resistor before trimming; and wherein said second portion of said first resistor has been trimmed to match said total resistance of said first resistor to said total resistance of said second resistor.

15. An integrated circuit comprising:

a substrate;

a first resistor on said substrate having a first portion of a first material having a first resistivity and a second portion of a second material having a second resistivity substantially smaller than said first resistivity;

a second resistor on said substrate having a first portion of said first material and a second portion of said second material; and wherein at least a selective portion of the second portion of the resistor having the smaller total resistance has been trimmed to match the total resistances of the first and second resistors.

16. A method of trimming resistors in an integrated circuit comprising:

forming a first resistor on a substrate having a first portion of a first material having a first resistivity and a second portion of a second material having a second resistivity substantially smaller than said first resistivity;

forming a second resistor on said substrate of said first material to have a total resistance more than the total resistance of said first resistor; and trimming said second portion of said first resistor to match said total resistance of said first resistor to said total resistance of said second resistor.

17. A method of trimming resistors in an integrated circuit comprising:

forming a first resistor on a substrate having a first portion of a first material having a first resistivity and a second portion of a second material having a second resistivity substantially smaller than said first resistivity;

forming a second resistor on said substrate having a first portion of said first material and a second portion of said second material; and trimming at least a selective portion of said second portion of the resistor having the smaller total resistance to match the total resistances of the first and second resistors.

* * * * *